(12) United States Patent
Kubota et al.

(10) Patent No.: US 11,027,612 B2
(45) Date of Patent: Jun. 8, 2021

(54) VEHICLE POWER SUPPLY SYSTEM

(71) Applicant: YAZAKI CORPORATION, Tokyo (JP)

(72) Inventors: Kazuhiro Kubota, Susono (JP); Masato Sasahara, Susono (JP); Masataka Komiyama, Susono (JP); Yoshihito Aoki, Susono (JP); Takaaki Izawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/746,760

(22) Filed: Jan. 17, 2020

(65) Prior Publication Data
US 2020/0262297 A1 Aug. 20, 2020

(30) Foreign Application Priority Data
Feb. 19, 2019 (JP) .............................. JP2019-027597

(51) Int. Cl.
| | |
|---|---|
| *B60L 3/04* | (2006.01) |
| *H02H 3/24* | (2006.01) |
| *H02H 7/26* | (2006.01) |
| *B60L 3/00* | (2019.01) |
| *B60R 16/033* | (2006.01) |

(52) U.S. Cl.
CPC ............ *B60L 3/0046* (2013.01); *B60L 3/0069* (2013.01); *B60L 3/04* (2013.01); *B60R 16/033* (2013.01); *H02H 3/243* (2013.01); *H02H 7/268* (2013.01); *B60L 2240/547* (2013.01)

(58) Field of Classification Search
CPC .... B60L 1/00; B60L 1/006; B60L 1/14; B60L 1/16; B60L 3/0046; B60L 3/0069; B60L 3/04; B60L 2240/547; B60R 16/03; B60R 16/033; H02H 3/24; H02H 3/243; H02H 7/26; H02H 7/268
See application file for complete search history.

(56) References Cited

U.S. PATENT DOCUMENTS

| | | | |
|---|---|---|---|
| 5,962,934 | A | 10/1999 | Fendt et al. |
| 6,127,741 | A | 10/2000 | Matsuda et al. |
| 2005/0001431 | A1 | 1/2005 | Sauer et al. |
| 2011/0095601 | A1 | 4/2011 | Johansson |
| 2020/0062200 | A1 | 2/2020 | Doernbach et al. |

FOREIGN PATENT DOCUMENTS

| | | |
|---|---|---|
| JP | 10-262330 A | 9/1998 |
| JP | 2010-243504 A | 10/2010 |
| WO | 2018/087260 A1 | 5/2018 |

*Primary Examiner* — Levi Gannon
(74) *Attorney, Agent, or Firm* — Keenealy Vaidya LLP

(57) ABSTRACT

A vehicle power supply system includes a power supply path, and an ECU detaching a fault occurrence portion occurring in a part of the power supply path from the power supply path based on a set value lower than a lowest operation voltage of a load and a voltage related to the power supply path. The set value is set within a normal range of the voltage related to the power supply path. The power supply path includes a plurality of electrical connection units connected to the load and a plurality of connection wirings connecting each of the electrical connection units in a loop shape. In a case that a part of voltages related to each of the connection wirings is equal to or less than the set value, the control unit supplies power to the load via another part of the voltages related to each of the connection wirings.

2 Claims, 6 Drawing Sheets

VEHICLE POWER SUPPLY SYSTEM

CROSS-REFERENCE TO RELATED APPLICATIONS

This application is based on and claims priority under 35 USC 119 from Japanese Patent Application No. 2019-027597 filed on Feb. 19, 2019, the contents of which are incorporated herein by reference.

TECHNICAL FIELD

The present disclosure relates to a vehicle power supply system.

BACKGROUND ART

In the related art, a vehicle power supply system is distributed to a plurality of distribution paths by an electrical connection unit such as a junction block, and a load is connected to each distribution path. Therefore, power supplied from a power supply mounted on a vehicle is supplied to each load via each of the plurality of distribution paths. Therefore, if a part of the distribution paths fail, since no power is supplied to the load connected to the part of the distribution paths, it is proposed that a power supply path that connects each of a plurality of electrical connection units in a loop shape is constituted, and then power is supplied to each load by detaching a short-circuited portion when a short circuit occurs (see, for example, Patent Literature 1).

CITATION LIST

Patent Literature

Patent Literature 1: JP-A-H10-262330

SUMMARY OF INVENTION

However, in the related art as described in Patent Literature 1, an overcurrent is detected based on a magnitude of a current flowing through each of the electrical connection units, and an abnormal portion is specified based on a direction of the current flowing through each of the electrical connection units. Therefore, although the short circuit of the power supply path can be detected and the short circuit portion can be detached from the power supply path, an earth fault occurring in the power supply path cannot be detected since a fluctuation amount between a magnitude of a current input to the electrical connection unit and a magnitude of a current output from the electrical connection unit is not detected, and an earth fault portion cannot be detached from the power supply path. Further, in addition to a circuit that detects the magnitude and direction of the current in each of the electrical connection units, Patent Literature 1 also provides a circuit that monitors a voltage for disconnection detection, but premises that occurrence of disconnection is only detected in a part of the power supply path and the magnitude and direction of the current are detected and cooperated in each of the electrical connection units.

The present disclosure has been made in view of such a situation, and it is possible to supply power to a load even though an earth fault occurs in a part of the power supply path.

A vehicle power supply system according to an aspect of the present disclosure is a vehicle power supply system that distributes power supplied from a power supply to a load. The vehicle power supply system includes a power supply path that supplies power supplied from the power supply to the load; and a control unit that detaches a fault occurrence portion occurring in a part of the power supply path from the power supply path based on a set value lower than a lowest operation voltage of the load and a voltage related to the power supply path. The set value is set within a normal range of the voltage related to the power supply path, the power supply path includes a plurality of electrical connection units connected to the load and a plurality of connection wirings that connect each of the electrical connection units in a loop shape. In a case that a part of voltages related to each of the connection wirings is equal to or less than the set value, the control unit supplies power to the load via another part of the voltages related to each of the connection wirings.

In the vehicle power supply system according to the aspect of the present disclosure, it is preferable that each of the electrical connection units includes: a first voltage sensor; a first cut-off switch connected in series adjacent to the first voltage sensor; a second cut-off switch connected in series with the first cut-off switch; and a second voltage sensor connected in series adjacent to the second cut-off switch. The connection wiring connects the first voltage sensor included in one of the electrical connection units adjacent to another of the electrical connection units and the second voltage sensor included in the other of the electrical connection units. The control unit opens the first cut-off switch adjacent to the first voltage sensor by which a lowest voltage is detected among voltages equal to or lower than the set value that are detected by the first voltage sensor in each of the electrical connection units, and opens the second cut-off switch adjacent to the second voltage sensor by which a lowest voltage is detected among voltages that are detected by the first voltage sensor in each of the electrical connection units.

It is preferable that the vehicle power supply system according to the aspect of the present disclosure further includes: an internal wiring that connects the first cut-off switch and the second cut-off switch in series; and a branch wiring provided by branching from the internal wiring and connected to the load.

According to the aspect of the present disclosure, even though the earth fault occurs in a part of the power supply path, power can be supplied to the load.

DESCRIPTION OF EMBODIMENTS

Hereinafter, an embodiment of the present disclosure will be described based on the drawings, but the present disclosure is not limited to the following embodiment.

Figure 1:
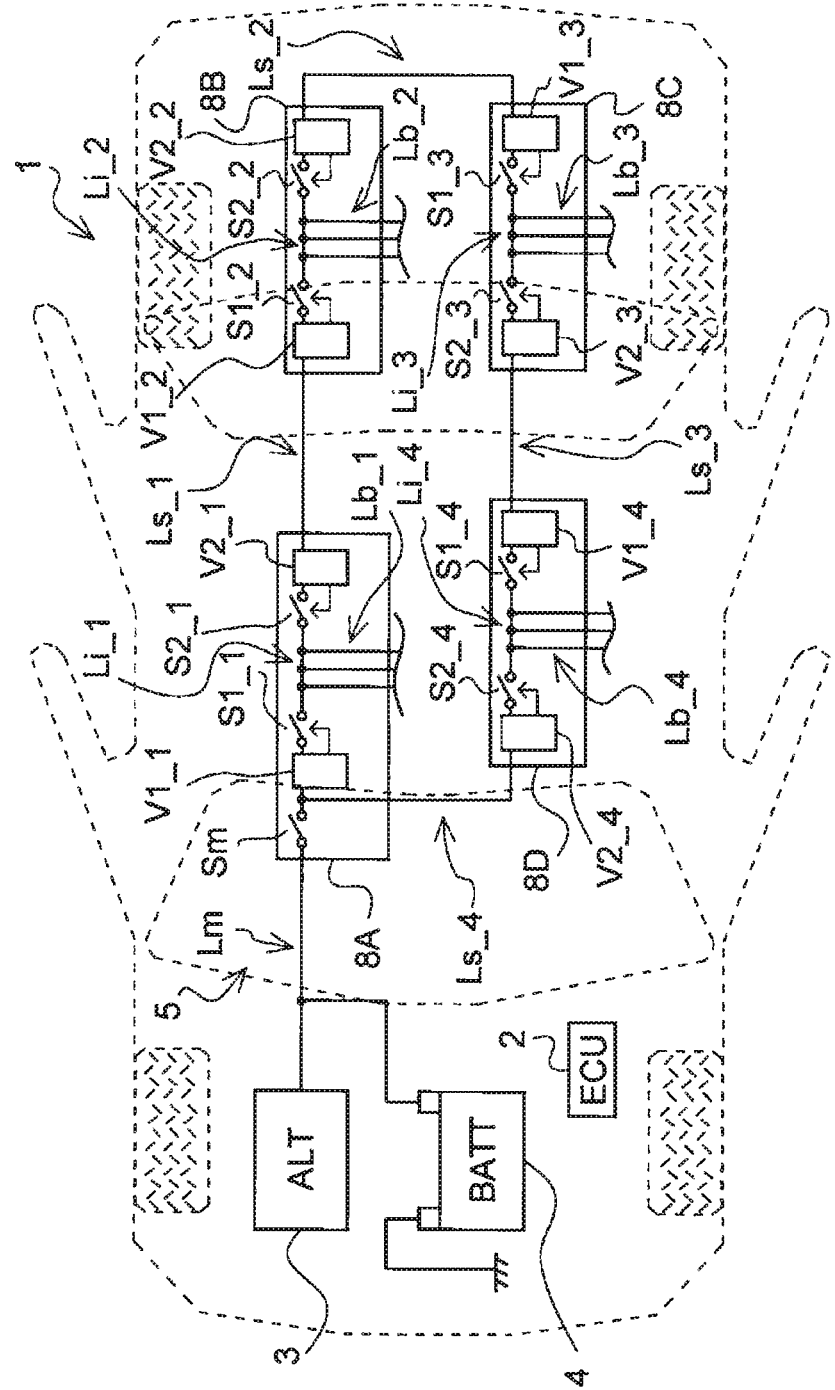
FIG. 1 is a diagram showing an example of a vehicle power supply system according to an embodiment to which the present disclosure is applied.

FIG. 1 is a diagram showing an example of a vehicle power supply system according to an embodiment to which the present disclosure is applied. The vehicle power supply system distributes power supplied from a power supply to a load, and is provided in a vehicle 1. The vehicle 1 includes an ECU 2, an alternator 3, a battery 4, a power supply path 5, and the like. The ECU 2, for example, controls the power supply path 5, which will be described later in detail, and functions as a control unit. The alternator 3 is driven to rotate by an engine (not shown) and generates alternating current power. The power generated by the alternator 3 is supplied to the battery 4 as charging power. The alternator 3 is connected to an upstream side of the battery 4, and the power supply path 5 is connected to a downstream side of the battery 4. The power supply path 5 supplies power supplied from the battery 4 functioning as the power supply to the load. The power supply path 5 is connected to a normal load such as lamps of a head and a tail, a horn, a meter in a dashboard, accessories, and a room lamp (none of which is shown). The ECU 2 is also connected as one of the loads.

Also, although FIG. 1 illustrates an example in which one battery 4 is mounted on the vehicle 1 to function as a power supply, a plurality of batteries 4 may be mounted on the vehicle 1. It is not limited to the battery 4 as long as it functions as the power supply, and may be a device that can store power such as a condenser, a capacitor, a secondary battery unit, and a thin sheet battery.

The power supply path 5 includes a main wiring Lm, a connection wiring Ls_1, a connection wiring Ls_2, a connection wiring Ls_3, a connection wiring Ls_4, an electrical connection unit 8A, an electrical connection unit 8B, an electrical connection unit 8C, and an electrical connection unit 8D. Any of the connection wiring Ls_1, the connection wiring Ls_2, the connection wiring Ls_3, and the connection wiring Ls_4 is generally referred to as a connection wiring Ls unless particularly limited. Any of the electrical connection unit 8A, the electrical connection unit 8B, the electrical connection unit 8C, and the electrical connection unit 8D is generally referred to as an electrical connection unit 8. The electrical connection unit 8 is connected to the load. Further, as one of the loads, the ECU 2 is at least connected to any of the electrical connection units 8A to 8D. The connection wiring Ls connects each of the electrical connection units 8A to 8D in a loop shape. Each of the electric connection units 8A to 8D connected in a loop shape is supplied with power from the battery 4 via the main wiring Lm.

The electrical connection unit 8 only needs to have a circuit configuration such as a junction block, a fuse box, and a relay box as long as it incorporates a function of an electrical connection box. The electrical connection unit 8A includes a first voltage sensor V1_1, a first cut-off switch S1_1, a second cut-off switch S2_1, and a second voltage sensor V2_1. The first cut-off switch S1_1 is adjacent to and connected in series with the first voltage sensor V1_1. The second cut-off switch S2_1 is connected in series with the first cut-off switch S1_1. The second voltage sensor V2_1 is adjacent to and connected in series with the second cut-off switch S2_1.

The electrical connection unit 8B includes a first voltage sensor V1_2, a first cut-off switch S1_2, a second cut-off switch S2_2, and a second voltage sensor V2_2. The first cut-off switch S1_2 is connected in series adjacent to the first voltage sensor V1_2. The second cut-off switch S2_2 is connected in series with the first cut-off switch S1_2. The second voltage sensor V2_2 is connected in series adjacent to the second cut-off switch S2_2.

The electrical connection unit 8C includes a first voltage sensor V1_3, a first cut-off switch S1_3, a second cut-off switch S2_3, and a second voltage sensor V2_3. The first cut-off switch S1_3 is connected in series adjacent to the first voltage sensor V1_3. The second cut-off switch S2_3 is connected in series with the first cut-off switch S1_3. The second voltage sensor V2_3 is connected in series adjacent to the second cut-off switch S2_3.

The electrical connection unit 8D includes a first voltage sensor V1_4, a first cut-off switch S1_4, a second cut-off switch S2_4, and a second voltage sensor V2_4. The first cut-off switch S1_4 is connected in series adjacent to the first voltage sensor V1_4. The second cut-off switch S2_4 is connected in series with the first cut-off switch S1_4. The second voltage sensor V2_4 is connected in series adjacent to the second cut-off switch S2_4.

Any of the first cut-off switches S1_1 to S1_4 is generally referred to as a first cut-off switch S1 unless particularly limited. Any of the second cut-off switches S2_1 to S2_4 is generally referred to as a second cut-off switch S2 unless particularly limited. Any of the first voltage sensors V1_1 to V1_4 is generally referred to as a first voltage sensor V1 unless particularly limited. Any of the second voltage sensors V2_1 to V2_4 is generally referred to as a second voltage sensor V2 unless particularly limited.

That is, each of the electrical connection units 8A to 8D includes the first voltage sensor V1, the first cut-off switch S1 adjacent to and connected in series with the first voltage sensor V1, the second cut-off switch S2 connected in series with the first cut-off switch S1, and the second voltage sensor V2 connected adjacent to the second cut-off switch S2.

The second voltage sensor V2_1 is connected with the first voltage sensor V1_2 via the connection wiring Ls_1. The second voltage sensor V2_2 is connected with the first voltage sensor V1_3 via the connection wiring Ls_2. The second voltage sensor V2_3 is connected with the first voltage sensor V1_4 via the connection wiring Ls_3. The second voltage sensor V2_4 is connected with the first voltage sensor V1_1 via the connection wiring Ls_4. That is, the connection wiring Ls connects the first voltage sensor V1 included in a part of adjacent ones of each of the electrical connection units 8A to 8D and the second voltage sensor V2 included in the other part thereof.

An internal wiring Li_1 is provided between the first cut-off switch S1_1 and the second cut-off switch S2_1. The internal wiring Li_1 connects the first cut-off switch S1_1 and the second cut-off switch S2_1 in series. Three branch wirings Lb_1 are provided in the internal wiring Li_1. The branch wiring Lb_1 is provided by branching from the internal wiring Li_1 and is connected to the load.

An internal wiring Li_2 is provided between the first cut-off switch S1_2 and the second cut-off switch S2_2. The internal wiring Li_2 connects the first cut-off switch S1_2 and the second cut-off switch S2_2 in series. Three branch wirings Lb_2 are provided in the internal wiring Li_2. The branch wiring Lb_2 is provided by branching from the internal wiring Li_2 and is connected to the load.

An internal wiring Li_3 is provided between the first cut-off switch S1_3 and the second cut-off switch S2_3. The internal wiring Li_3 connects the first cut-off switch S1_3 and the second cut-off switch S2_3 in series. Three branch wirings Lb_3 are provided in the internal wiring Li_3. The branch wiring Lb_3 is provided by branching from the internal wiring Li_3 and is connected to the load.

An internal wiring Li_4 is provided between the first cut-off switch S1_4 and the second cut-off switch S2_4. The internal wiring Li_4 connects the first cut-off switch S1_4 and the second cut-off switch S2_4 in series. Three branch wirings Lb_4 are provided in the internal wiring Li_4. The branch wiring Lb_4 is provided by branching from the internal wiring Li_4 and is connected to the load.

Any of the internal wiring Li_1 to the internal wiring Li_4 is generally referred to as an internal wiring Li unless particularly limited. Any of the branch wiring Lb_1 to Lb_4 is generally referred to as a branch wiring Lb unless particularly limited. In addition, since the first cut-off switch S1 needs to operate at high speed when an earth fault is detected by any of the connection wiring Ls, the first cut-off switch S1 is composed of a semiconductor relay.

The main switch Sm is provided in the electrical connection unit 8A. However, the main switch Sm may be provided in the electrical connection unit 8D instead of the electrical connection unit 8A. That is, the main switch Sm only needs to be provided in the electrical connection unit 8 connected in parallel with the main wiring Lm. Therefore, for example, in a circuit configuration, if the electrical connection unit 8B and the electrical connection unit 8C are connected in parallel with the main wiring Lm, the main switch Sm only needs to be provided in any of the electrical connection unit 8B and the electrical connection unit 8C. In a circuit configuration, if the electrical connection unit 8C and the electrical connection unit 8D are connected in parallel with the main wiring Lm, the main switch Sm only needs to be provided in any of the electrical connection unit 8C and the electrical connection unit 8D. In a circuit configuration, if the electrical connection unit 8A and the electrical connection unit 8B are connected in parallel with the main wiring Lm, the main switch Sm only needs to be provided in any of the electrical connection unit 8A and the electrical connection unit 8B.

In the circuit configuration as described above, even though an earth fault occurs in a part of the power supply path 5, the part can be detached, and a circuit configuration in which the other part of the power supply path 5 supplies power to the load is possible. Specifically, the connection wiring Ls_1 is provided between the second voltage sensor V2_1 and the first voltage sensor V1_2. That is, the connection wiring Ls_1 is connected between the second cut-off switch S2_1 and the first cut-off switch S1_2. Therefore, if each of the second cut-off switch S2_1 and the first cut-off switch S1_2 is controlled to an open state, the connection wiring Ls_1 is detached from the power supply path 5. Even though the connection wiring Ls_1 is detached from the power supply path 5, a circuit configuration in which power is supplied from the main wiring Lm to the load via the electrical connection unit 8A and a circuit configuration in which power is supplied from the main wiring Lm to the load via each of the electrical connection units 8D, 8C, and 8B are formed, so that power can be supplied to each of the electrical connection units 8A to 8D. Therefore, power can be supplied to the load via each of the electrical connection units 8A to 8D.

Similarly, the connection wiring Ls_2 is provided between the second voltage sensor V2_2 and the first voltage sensor V1_3. That is, the connection wiring Ls_2 is connected between the second cut-off switch S2_2 and the first cut-off switch S1_3. Therefore, if each of the second cut-off switch S2_2 and the first cut-off switch S1_3 is controlled to an open state, the connection wiring Ls_2 is detached from the power supply path 5. Even though the connection wiring Ls_2 is detached from the power supply path 5, a circuit configuration in which power is supplied from the main wiring Lm to the load via each of the electrical connection units 8A and 8B and a circuit configuration in which power is supplied from the main wiring Lm to the load via each of the electrical connection units 8D and 8C are formed, so that power can be supplied to each of the electrical connection units 8A to 8D. Therefore, power can be supplied to the load via each of the electrical connection units 8A to 8D.

Similarly, the connection wiring Ls_3 is provided between the second voltage sensor V2_3 and the first voltage sensor V1_4. That is, the connection wiring Ls_3 is connected between the second cut-off switch S2_3 and the first cut-off switch S1_4. Therefore, if each of the second cut-off switch S2_3 and the first cut-off switch S1_4 is controlled to an open state, the connection wiring Ls_3 is detached from the power supply path 5. Even though the connection wiring Ls_3 is detached from the power supply path 5, a circuit configuration in which power is supplied from the main wiring Lm to the load via each of the electrical connection units 8A to 8C and a circuit configuration in which power is supplied from the main wiring Lm to the load via the electrical connection unit 8D are formed, so that power can be supplied to each of the electrical connection units 8A to 8D. Therefore, power can be supplied to the load via each of the electrical connection units 8A to 8D.

Similarly, the connection wiring Ls_4 is provided between the second voltage sensor V2_4 and the first voltage sensor V1_1. That is, the connection wiring Ls_4 is connected between the second cut-off switch S2_4 and the first cut-off switch S1_1. Therefore, if each of the second cut-off switch S2_4 and the first cut-off switch S1_1 is controlled to an open state, the connection wiring Ls_4 is detached from the power supply path 5. Even though the connection wiring Ls_4 is detached from the power supply path 5, a circuit configuration in which power is supplied from the main wiring Lm to the load via each of the electrical connection units 8A to 8D is formed, so that power can be supplied to each of the electrical connection units 8A to 8D. Therefore, power can be supplied to the load via each of the electrical connection units 8A to 8D.

Control for forming the circuit configuration described above will be specifically described. A voltage detected by each of the first voltage sensor V1 and the second voltage sensor V2 is supplied to the ECU 2 of FIG. 1. The ECU 2 can control each of the first cut-off switch S1 and the second cut-off switch S2 to either an open state or a closed state by supplying a control signal to each of the first cut-off switch S1 and the second cut-off switch S2. A gate circuit that controls each of the first cut-off switch S1 and the second cut-off switch S2 is not shown depending on a control signal supplied from the ECU 2.

On the basis of a set value and a voltage related to the power supply path 5, the EUC 2 detaches a failure occurrence portion generated in a part of the power supply path 5 from the power supply path 5. The set value is a value lower than a lowest operation voltage of the load, and is set within a normal range of the voltage related to the power supply path 5. For example, if the battery 4 is a 12 V system, the lowest operation voltage of the load including the ECU 2 is about 8 V to 9 V. Therefore, if the power supply path 5 is normal, since the voltage related to the power supply path 5 does not become 7 V or less, the set value only needs to be set to a voltage lower than the lowest operation voltage, for example, about 7 V.

When a part of voltages related to each of the connection wirings Ls are equal to or lower than the set value, the ECU 2 supplies power to the load via the other part thereof. Specifically, in each of the electrical connection units 8A to 8D, the ECU 2 opens the first cut-off switch S1 that is adjacent to a first voltage sensor V1 by which a lowest voltage is detected among voltages equal to or lower than the set value that are detected by the first voltage sensor V1. In addition, the ECU 2 opens the second cut-off switch S2 that is adjacent to a second voltage sensor V2 by which a lowest voltage is detected among voltages detected by the second voltage sensor V2.

Figure 2:
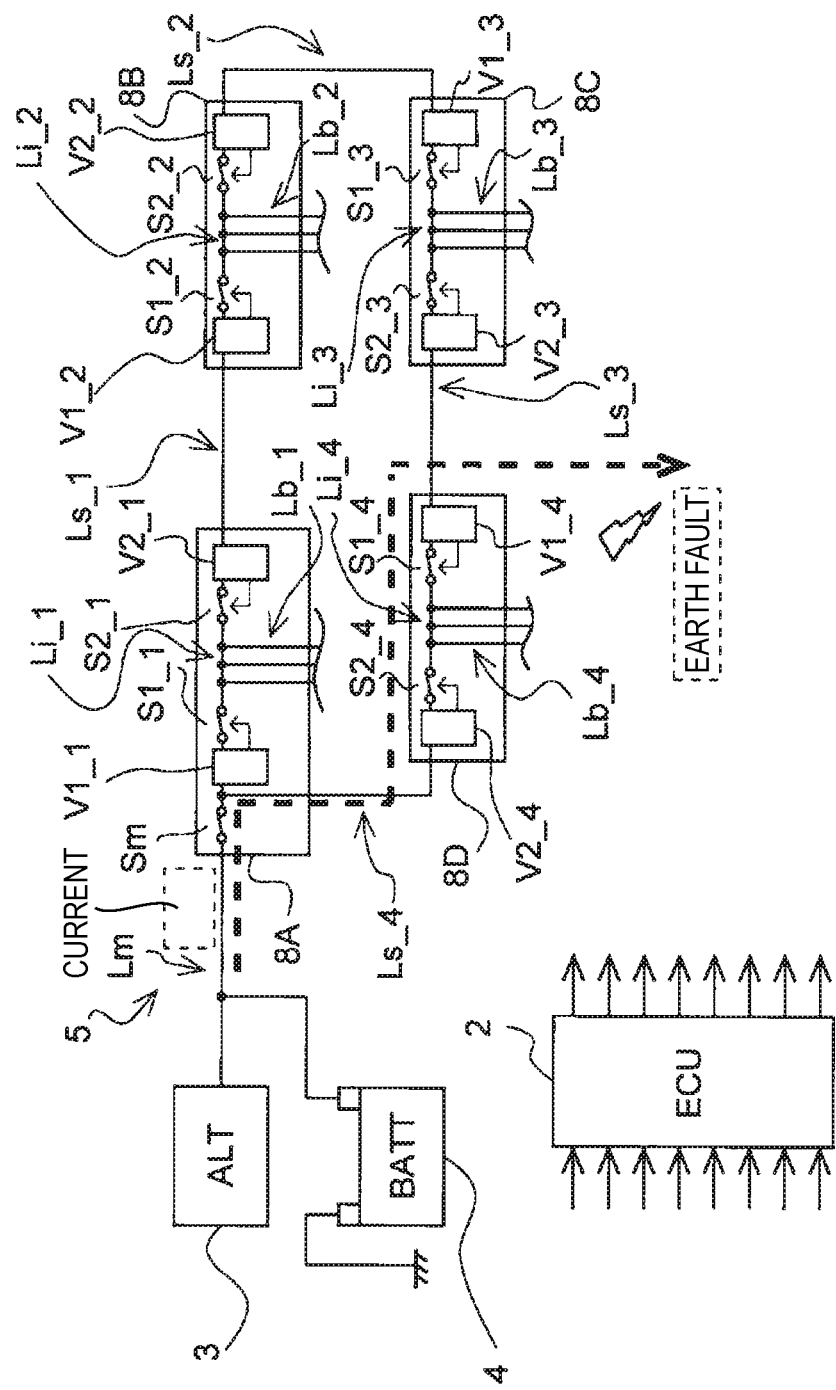
FIG. 2 is a diagram showing an example of a current path when an earth fault occurs according to the embodiment to which the present disclosure is applied.
Figure 3:
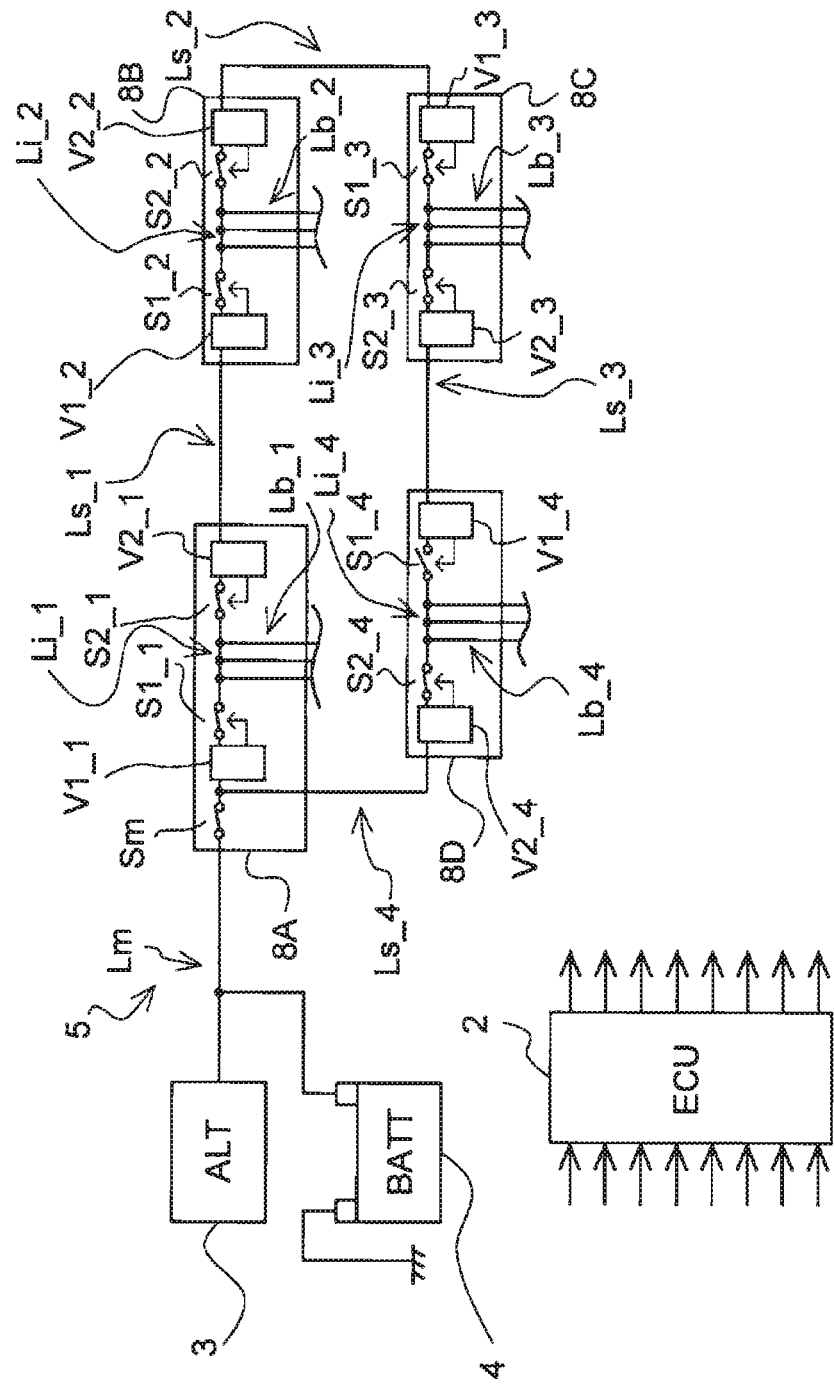
FIG. 3 is a diagram showing an example in which a first cut-off switch is in an open state when an earth fault occurs according to the embodiment to which the present disclosure is applied.

Next, a specific circuit configuration will be described using FIG. 2 to FIG. 5. FIG. 2 is a diagram showing an example of a current path when an earth fault occurs according to the embodiment to which the present disclosure is applied. FIG. 3 is a diagram showing an example in which a first cut-off switch S1_4 is in an open state when an earth fault occurs according to the embodiment to which the present disclosure is applied. In an example of FIG. 2, the earth fault occurs in the connection wiring Ls_3, and a current flows through the main wiring Lm, the connection wiring Ls_4, the electrical connection unit 8D, and the connection wiring Ls_3 to a frame ground (not shown). Therefore, among the first voltage sensor V1 and the second voltage sensor V2, a voltage detected by the first voltage sensor V1_4 included in the electrical connection unit 8D of the electrical connection unit 8 is the lowest. In this case, as shown in FIG. 3, the first cut-off switch S1_4 adjacent to the first voltage sensor V1_4 is controlled to an open state.

Figure 4:
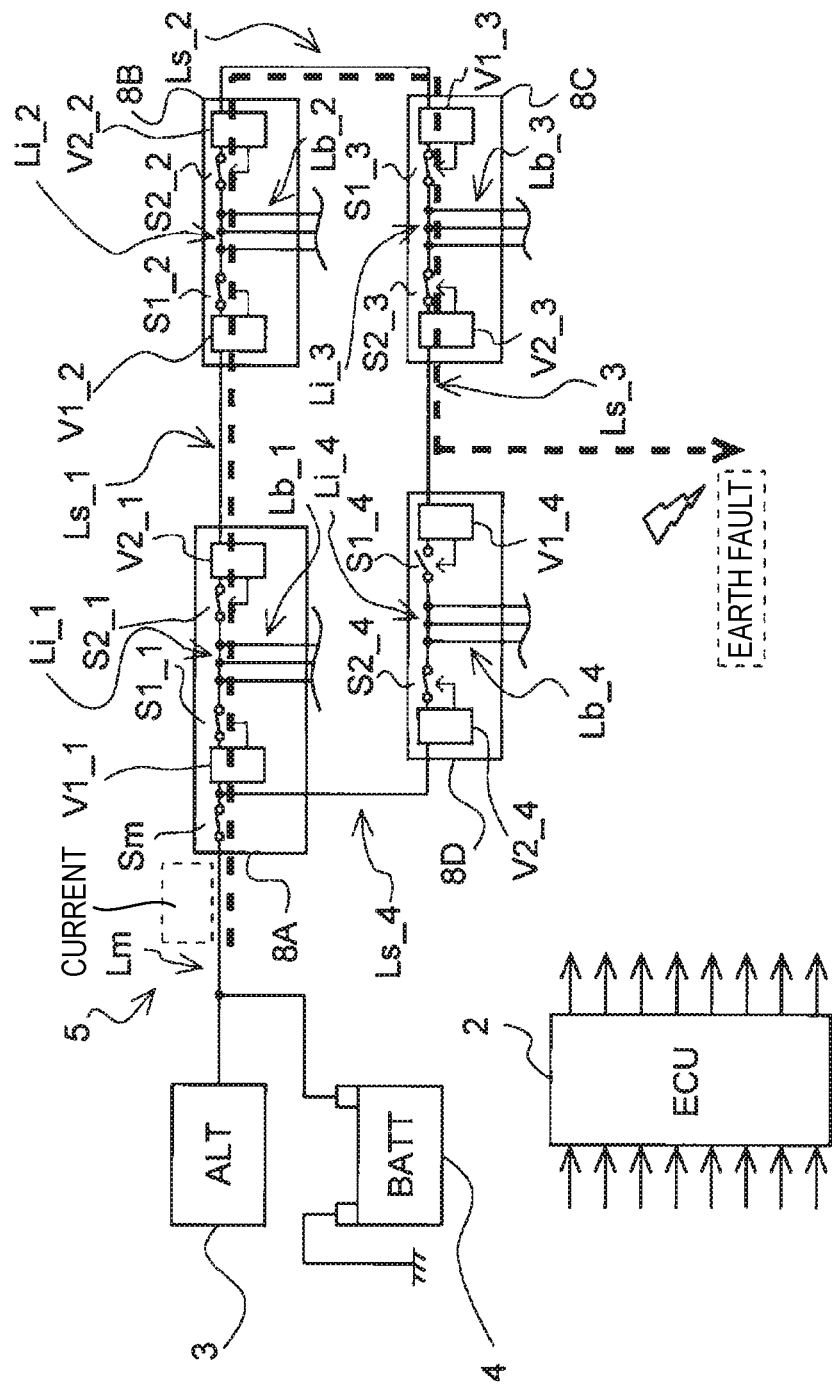
FIG. 4 is a diagram showing an example of the current path associated with the first cut-off switch is in an open state when an earth fault occurs according to the embodiment to which the present disclosure is applied.
Figure 5:
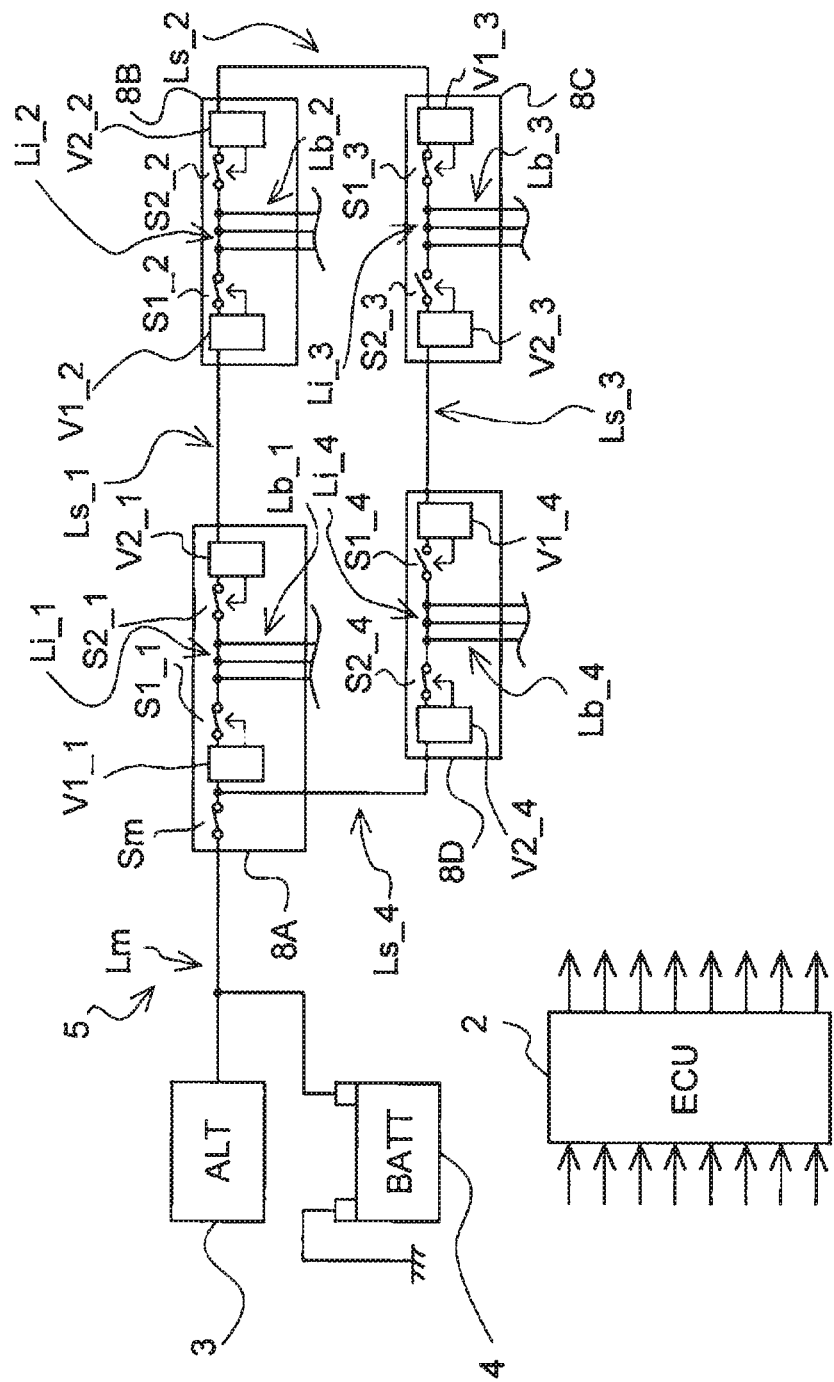
FIG. 5 is a diagram showing an example in which a second cut-off switch is in an open state as the first cut-off switch is in an open state when an earth fault occurs according to the embodiment to which the present disclosure is applied.

FIG. 4 is a diagram showing an example of the current path as the first cut-off switch S1_4 is in an open state when an earth fault occurs according to the embodiment to which the present disclosure is applied. FIG. 5 is a diagram showing an example in which a second cut-off switch S2_3 is in an open state as the first cut-off switch S1_4 is in an open state when an earth fault occurs according to the embodiment to which the present disclosure is applied. Since the earth fault occurs in the connection wiring Ls_3, as shown in FIG. 4, a current flows through the main wiring Lm, the electrical connection unit 8A, the connection wiring Ls_1, the electrical connection unit 8B, the connection wiring Ls_2, the electrical connection unit 8B, and the connection wiring Ls_3 to the frame ground (not shown). Therefore, among the first voltage sensor V1 and the second voltage sensor V2, a voltage detected by the second voltage sensor V2_3 included in the electrical connection unit 8C of the electrical connection unit 8 is the lowest. In this case, as shown in FIG. 5, the second cut-off switch S2_3 adjacent to the second voltage sensor V2_3 is controlled to an open state.

Figure 6:
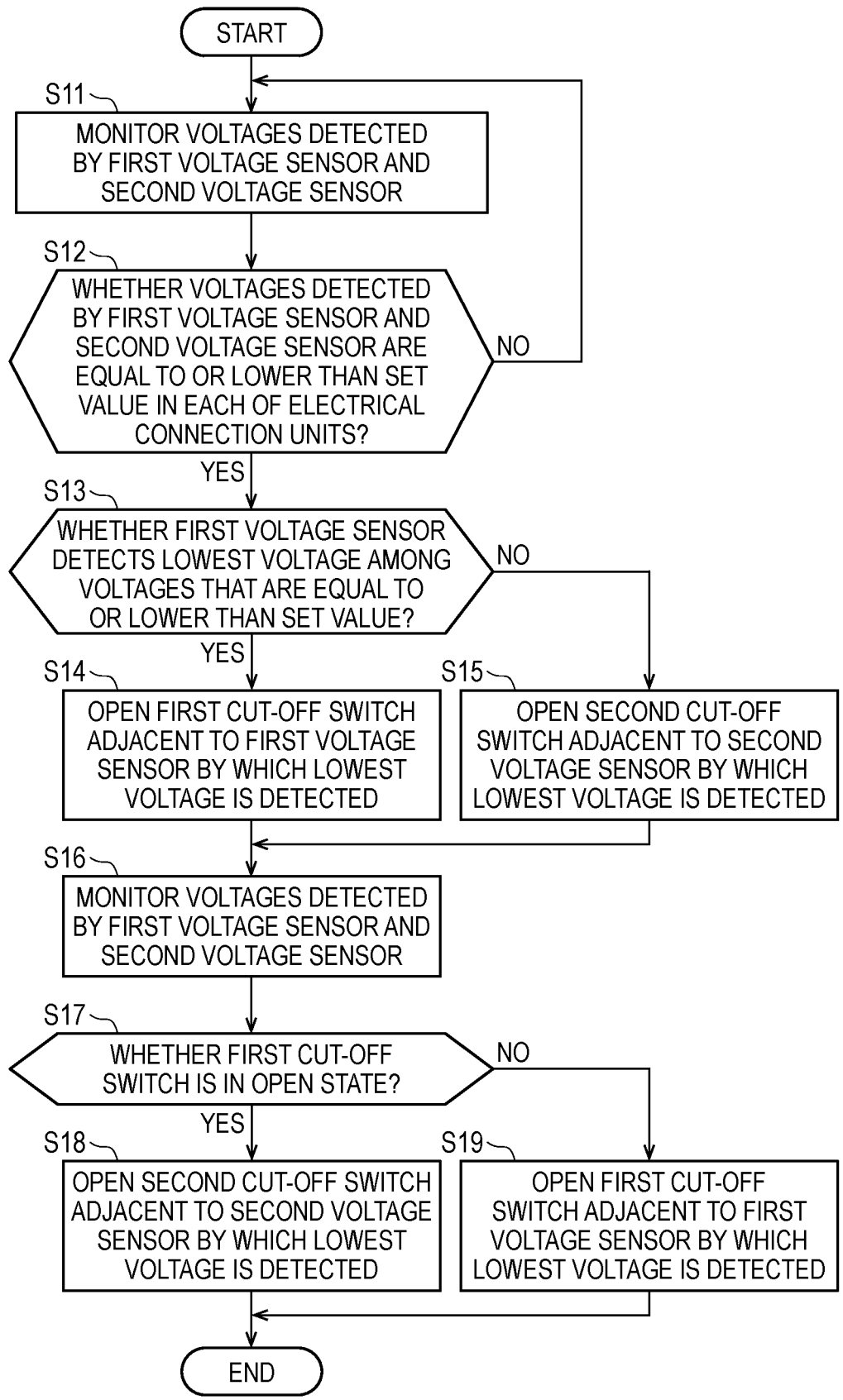
FIG. 6 is a flowchart illustrating a control example when an earth fault occurs according to the embodiment to which the present disclosure is applied.

Next, specific operation will be described using FIG. 6. FIG. 6 is a flowchart illustrating a control example when an earth fault occurs according to the embodiment to which the present disclosure is applied. In step S11, the ECU 2 monitors voltages detected by the first voltage sensor V1 and the second voltage sensor V2, and the process transits to step S12. In step S12, the ECU 2 determines whether the voltages detected by the first voltage sensor V1 and the second voltage sensor V2 are equal to or lower than the set value in each of the electrical connection units 8A to 8D. When the ECU 2 determines that the voltages detected by the first voltage sensor V1 and the second voltage sensor V2 are equal to or lower than the set value (step S12; Y) in each of the electrical connection units 8A to 8D, the process transits to step S13. When the ECU 2 determines that the voltages detected by the first voltage sensor V1 and the second voltage sensor V2 are not equal to or lower than the set value (step S12; N) in each of the electrical connection units 8A to 8D, the process returns to step S11.

In step S13, the ECU 2 determines whether the first voltage sensor V1 detects the lowest voltage among the voltages that are equal to or lower than the set value. When the ECU 2 determines that the first voltage sensor V1 detects the lowest voltage among the voltages that are equal to or lower than the set value (step S13; Y), the process transits to step S14. When the ECU 2 determines that the first voltage sensor V1 does not detect the lowest voltage among the voltages that are equal to or lower than the set value, that is, when the second voltage sensor V2 detects the lowest voltage (step S13; N), the process transits to step S15. In step S14, the ECU 2 opens the first cut-off switch S adjacent to the first voltage sensor V1 by which the lowest voltage is detected, and the process transits to step S16. In step S15, the ECU 2 opens the second cut-off switch S2 adjacent to the second voltage sensor V2 by which the lowest voltage is detected, and the process transits to step S16.

In step S16, the ECU 2 monitors voltages detected by the first voltage sensor V1 and the second voltage sensor V2, and the process transits to step S17. In step S17, the ECU 2 determines whether the first cut-off switch S1 is in the open state. When the ECU 2 determines that the first cut-off switch S1 is in the open state (step S17; N), the process transits to step S18. When the ECU 2 determines that the first cut-off switch S1 is not in the open state (step S17; N), the process transits to step S19. In step S18, the ECU 2 opens the second cut-off switch S2 adjacent to the second voltage sensor V2 by which the lowest voltage is detected, and the process ends. In step S19, the ECU 2 opens the first cut-off switch S1 adjacent to the first voltage sensor V1 by which the lowest voltage is detected, and the process ends.

From the above description, when a part of the voltages related to each of the plurality of connection wirings Ls_1 to Ls_4 that connect each of the electrical connection units 8A to 8D in a loop shape is equal to or lower than the set value, power is supplied to the load via the other part thereof. If a part of the voltages related to the connection wirings Ls become equal to or lower than the set value, an earth fault occurs. Therefore, since power is supplied to the load via the other part of the voltages related to the connection wirings Ls, power is supplied to the load via the connection wirings Ls in which an earth fault does not occur. Therefore, even though the earth fault occurs in a part of the power supply path 5, power can be supplied to the load. Since the earth fault is detected only by a magnitude relationship of the voltage, a circuit that detects a direction of a current is not required in the power supply path 5.

In the present embodiment, in each of the electrical connection units 8A to 8D, the first cut-off switch S1 adjacent to the first voltage sensor V1 by which the lowest voltage is detected among voltages equal to or lower than the set value that are detected by the first voltage sensors V1 is set to an open state, and the second cut-off switch S2 adjacent to the second voltage sensor V2 by which the lowest voltage is detected among voltages that are detected by the second voltage sensor V2 is set to an open state. Therefore, the connection wiring Ls in which the earth fault occurs can be detached from the other connection wirings Ls. Therefore, since a fault portion can be detached from the power supply path 5, it is possible to recover the voltage related to the power supply path 5 to a normal voltage and to return to a state of supplying power to the load.

In the present embodiment, the branch wiring Lb is provided by branching from the internal wiring Li that connects the first cut-off switch S1 and the second cut-off switch S2 in series, and is connected to the load. Therefore, even though any one of the first cut-off switch S1 and the second cut-off switch S2 is controlled to an open state per electrical connection unit 8, the branch wiring Lb is connected to the load, so that power can be supplied to the load. Therefore, power can be supplied reliably to the load.

Although the vehicle power supply system to which the present disclosure is applied has been described above based on the embodiment, the present disclosure is not limited thereto, and changes may be made without departing from the spirit of the present disclosure.

For example, in the present embodiment, a circuit configuration in which branch wirings Lb branch per three from the internal wiring Li has been described, but the present disclosure is not particularly limited thereto. For example, there may be a circuit configuration in which the branch wiring Lb_1 branches into one from the internal wiring Li_1, the branch wiring Lb_2 branches into two from the internal wiring Li_2, the branch wiring Lb_3 branches into five from the internal wiring Li_3, and the branch wiring Lb_4 branches into three from the internal wiring Li_4.

For example, in the present embodiment, the circuit configuration in which the four electrical connection units 8 are connected in a loop shape via the connection wirings Ls has been described, but the present disclosure is not particularly limited thereto. For example, there may be a circuit configuration in which five or more electrical connection units 8 or three or less electrical connection units 8 are connected in a loop shape via the connection wirings Ls. That is, there only needs to be a circuit configuration in which at least two electrical connection units 8 are connected in a loop shape.

For example, in the present embodiment, the circuit configuration in which the main switch Sm is provided in any of the electrical connection units 8 has been described, but the present disclosure is not particularly limited thereto. For example, there may be a circuit configuration in which the main switch Sm is included in the main wiring Lm. If it is the circuit configuration in which the main switch Sm is included in the main wiring Lm, the main switch Sm may not be provided in any of the electrical connection units 8.

What is claimed is:

1. A vehicle power supply system for distributing power supplied from a power supply to a load, the vehicle power supply system comprising:
   a power supply path that supplies power supplied from the power supply to the load;
   a control unit that detaches a fault occurrence portion occurring in a part of the power supply path from the power supply path based on a set value lower than a lowest operation voltage of the load and a voltage related to the power supply path,
   wherein the set value is set within a normal range of the voltage related to the power supply path,
   wherein the power supply path includes a plurality of electrical connection units connected to the load and a plurality of connection wirings that connect each of the electrical connection units in a loop shape,
   wherein in a case that a part of voltages related to each of the connection wirings is equal to or less than the set value, the control unit supplies power to the load via another part of the voltages related to each of the connection wirings,
   wherein each of the electrical connection units includes:
      a first voltage sensor;
      a first cut-off switch connected in series adjacent to the first voltage sensor;
      a second cut-off switch connected in series with the first cut-off switch; and
      a second voltage sensor connected in series adjacent to the second cut-off switch,
   the connection wiring connects the first voltage sensor included in one of the electrical connection units adjacent to another of the electrical connection units and the second voltage sensor included in the other of the electrical connection units, and
   the control unit opens the first cut-off switch adjacent to the first voltage sensor by which a lowest voltage is detected among voltages equal to or lower than the set value that are detected by the first voltage sensor in each of the electrical connection units, and opens the second cut-off switch adjacent to the second voltage sensor by which a lowest voltage is detected among voltages that are detected by the second voltage sensor in each of the electrical connection units.

2. The vehicle power supply system according to claim 1, further comprising
   an internal wiring that connects the first cut-off switch and the second cut-off switch in series; and
   a branch wiring that branches from the internal wiring and is connected to the load.

\* \* \* \* \*